ized Patent [19]

Lombardino

[11] 3,892,740
[45] July 1, 1975

[54] PROCESS FOR THE PRODUCTION OF CARBOXAMIDES OF OXO-1,2-BENZOTHIAZINE-1,1-DIOXIDES

[75] Inventor: Joseph G. Lombardino, Niantic, Conn.

[73] Assignee: Pfizer Inc., New York, N.Y.

[22] Filed: Oct. 15, 1974

[21] Appl. No.: 514,570

[52] U.S. Cl. .............................. 260/243 R; 424/246
[51] Int. Cl. ............................................. C07d 93/02
[58] Field of Search ................................ 260/243 R

[56] References Cited
UNITED STATES PATENTS

| | | | |
|---|---|---|---|
| 3,646,020 | 2/1972 | Zinnes et al. | 260/243 |
| 3,853,862 | 12/1974 | Lombardino | 260/243 |

Primary Examiner—John M. Ford
Attorney, Agent, or Firm—Connolly and Hutz

[57] ABSTRACT

Disclosed herein is an improved process for the production of carboxamides of 3,4-dihydro-oxo-1,2-benzothiazine-1,1-dioxides. Said process comprises contacting either a 4-alkoxy-1,2-benzothiazine-3-carboxylic acid-1,1-dioxide or a 3-alkoxy-1,2-benzothiazine-4-carboxylic acid-1,1-dioxide with an amine followed by cleavage of the ether moiety with an appropriate reagent such as hydrogen bromide to produce a carboxanilide with previously disclosed pharmaceutical value as a non-steroidal anti inflammatory agent. The alkoxy-benzothiazine carboxylic acids are themselves novel compounds and valuable synthetic intermediates.

12 Claims, No Drawings

PROCESS FOR THE PRODUCTION OF CARBOXAMIDES OF OXO-1,2-BENZOTHIAZINE-1,1-DIOXIDES

CROSS REFERENCE TO RELATED PATENTS

The products of the process of the instant invention are claimed in my commonly assigned U.S. Pat. No. 3,591,584, issued July 6, 1971, the disclosure of which is incorporated herein by reference.

BACKGROUND OF THE INVENTION

This invention relates to a process for the production of benzothiazine dioxides which have been found to be valuable anti-inflammatory agents that do not produce the undesirable side-effects frequently experienced with corticosteroids. In particular, it relates to an improved chemical process for the production of N-substituted-3,4-dihydro-2-substituted-4-oxo-2H-1,2-benzothiazine-3-carboxamide-1,1-dioxides and N-substituted-3,4-dihydro-2-substituted-3-oxo-2H-1,2-benzothiazine-4-carboxamide-1,1-dioxide wherein the N-substituent is a heterocyclic moiety As disclosed in U.S. Pat. No. 3,591,584, two routes are available for the synthesis of N-substituted-benzothiazine-carboxamides. The first, used wherein the N-substituent is not a heterocyclic moiety, comprises contacting a compound of the general formula

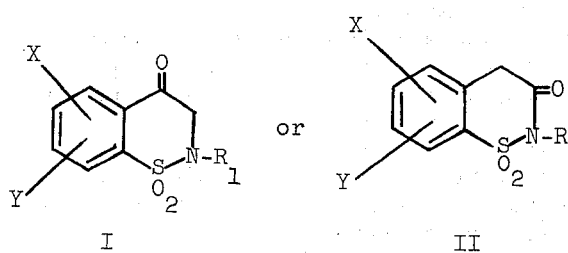

wherein X, Y and $R_1$ are as defined herein below, with an organic isocyanate of the formula R'NCO wherein R' is selected from the group consisting of hydrogen, alkyl having one to eight carbon atoms, phenylalkyl having up to three carbon atoms in the alkyl moiety, phenyl, substituted phenyl and naphthyl to produce a compound of the general structural formula

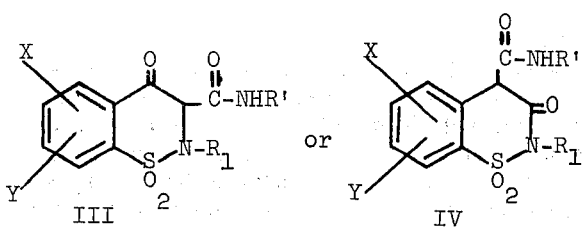

The second method was employed in the preparation of those compounds wherein the N-substituent is a heterocyclic moiety such as substituted or unsubstituted pyridyl, pyrimidyl, pyrazinyl, pyridazinyl, pyrazolonyl, thiazolyl, isothiazolyl, benzothiazolyl, benzoxazolyl or thiadiazolyl. The isocyanate route was not used to prepare these compounds because the requisite heterocyclic isocyanates are either unstable or extremely difficult to synthesize. The 4-carboxamides were prepared from compounds of Formula IV wherein R' is a mono-, di- or unsubstituted phenyl and the substituents are chosen from the group consisting of fluorine, chlorine, bromine, nitro, trifluoromethyl and alkyl and alkoxy having from one to three carbon atoms. Said compounds were contacted with an alcohol to form the corresponding 3- or 4-carboxylic acid ester by the alcoholysis method well-known to those skilled in the art. The 3-carboxamides were prepared from known compounds such as a 3-oxo-1,2-benzothiazoline-2-acetic acid ester, [Chemische Berichte, Vol. 30, p. 1267 (1897).]. Said benzothiazolines were treated with an alkali metal alkoxide like sodium methoxide in a polar solvent such as dimethylsulfoxide or dimethylformamide whereby they rearrange to the corresponding 3,-4-dihydro-4-oxo-2H-1,2-benzothiazine-3-carboxylate-1,1-dioxide ester. [Journal of Organic Chemistry, Vol. 30 p. 2241 (1965).]. This compound is then treated with an alkyl halide, preferably an iodide, wherein the alkyl group is identical with $R_1$ to yield the desired ester. Said 3- and 4- esters were then contacted with at least an equimolar amount of an amine of the general formula R''$NH_2$ wherein R'' is one of the heterocyclic moieties of interest to produce the desired benzothiazine carboxamide which is N-substituted with a heterocyclic moiety. Standard ammonolysis procedures known to those skilled in the art of organic chemistry were employed.

SUMMARY OF THE INVENTION

The process of this invention is for the production of a 3,4-dihydro-2H-1,2-benzothiazine-carboxamide-1,1-dioxide of the formula

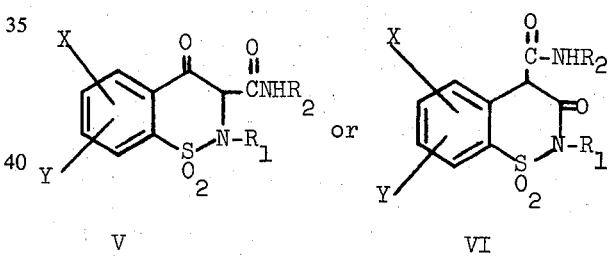

wherein X and Y are each selected from the group consisting hydrogen, fluorine, chlorine, bromine, nitro, trifluoromethyl and alkyl and alkoxy each having from one to five carbon atoms; $R_1$ is a member selected from the group consisting of hydrogen, alkyl having up to six carbon atoms, alkenyl having up to four carbon atoms, and phenylalkyl having up to three carbon atoms in the alkyl moiety;

and $R_2$ is a member selected from the group consisting of hydrogen, alkyl having from one to eight carbon atoms, alkenyl having up to six carbon atoms, cycloalkyl having up to eight carbon atoms, phenylalkyl having up to three carbon atoms in the alkyl moiety, phenyl, nitrophenyl, naphthyl, 2-pyridyl, 3-methyl-2-pyridyl, 4-methyl-2-pyridyl, 5-methyl-2-pyridyl, 6-methyl-2-pyridyl, 4,6-dimethyl-2-pyridyl, 5-chloro-2-pyridyl, 5-bromo-2-pyridyl, 5-nitro-2-pyridyl, 5-carboxamido-2-pyridyl, 2-pyrazinyl, 2-pyrimidyl, 4,5-dimethyl-2-pyrimidyl, 4-pyrimidyl, 5-methyl-3-pyrazinyl, 6-methoxy-3-pyridazinyl, 1-phenyl-3-pyrazolonyl, 2-thiazolyl, 4-methyl-2-thiazolyl, 4-phenyl-2-thiazolyl, 5-bromo-2-thiazolyl, 4,5-dimethyl-2-thiazolyl, 3-isothiazolyl, 2-benzothiazolyl, 6-methyl-2- benzothiazolyl, 4-chloro-2-benzothiazolyl, 6-bromo-2-benzothiazolyl, 5-chloro-2-benzoxazolyl, 1,3,4-thiadiazolyl, 5-methyl-1,2,4-thiadiazolyl, 5-methyl-1,3,4-thiadiazolyl, 1,2,4-triazolyl and 6-phenyl-1,2,4-triazolyl, 7-indazolyl, and mono- and disubstituted phenyl wherein each substituent is selected from the group consisting of halogen, hydroxy, alkoxy and thioalkoxy having up to three carbon atoms, alkyl having up to four carbon atoms, trifluoromethyl, acetyl, methylsulfinyl and methylsulfonyl.

Said process comprises contacting a compound of the structure

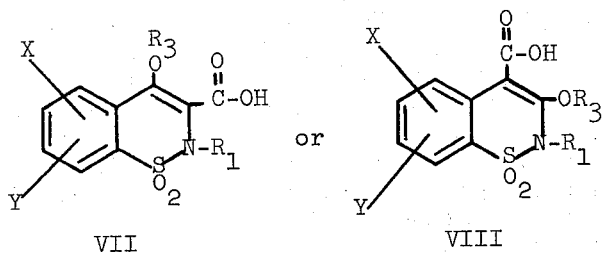

VII  VIII wherein $R_3$ is selected from the group consisting of lower alkyl and phenylalkyl having up to three carbon atoms in the alkyl moiety, with a substantially equimolar portion of an amine of the formula $R_2NH_2$ in reaction-inert solvent such as substantially anhydrous tetrahydrofuran or dioxane in the presence of a molar excess of a suitable coupling promoter such as N-ethoxycarbonyl-2-ethoxy-1,2-dihydroquinoline, $POCl_3$, dicyclohexylcarbodiimide or N,N'-carbonyl-diimidazole until the reaction to form the corresponding carboxamide is substantially complete. Said carboxamide is then contacted with hydrobromic acid in a reaction-inert solvent such as acetic acid at a temperature between about 50° and 90°C. until the reaction to form the corresponding oxo-carboxamide of Formula V or VI is substantially complete.

Preferred products of the process of the instant invention are the 3-carboxamides, those in which $R_1$ is methyl, those in which X and Y are each hydrogen and those in which $R_2$ is 2-thiazolyl or 2-pyridyl. Especially preferred as products are N-(2-thiazolyl)- and N-(2-pyridyl)-3,4-dihydro-2-methyl-4-oxo-2H-1,2-benzothiazine-3-carboxamide-1,1-dioxide.

The alkoxybenzothiazine carboxylic acids of Formulas VII and VIII are themselves novel and valuable synthetic intermediates. They may be prepared in a large number of ways, for instance from the known corresponding oxobenzothiazine carboxylic acid esters or methyl ketones. The esters are hydrolyzed to the acid by a variety of methods known to those skilled in the art. The methyl ketones are oxidized to the acid using, for example, iodine in pyridine.

The preferred starting materials are those of Formula VII and those in which $R_3$ is a secondary or tertiary alkyl especially 2-propyl and the preferred coupling promoter is N-ethoxycarbonyl-2-ethoxy-1,2-dihydroquinoline.

DETAILED DESCRIPTION OF THE INVENTION

It is known to those skilled in the art that compounds of the structure shown in Formulas I through VI exist as mixtures of keto and enol tautomers. These formulas show the keto tautomers; the enol tautomers have structures of the type

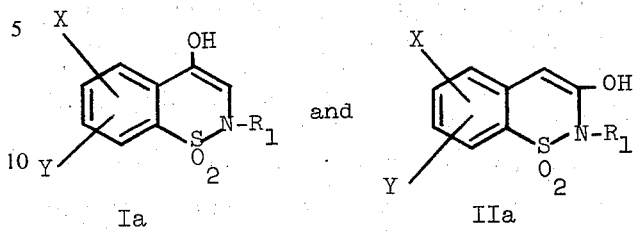

Ia  IIa which differ from the keto tautomers only in the shift of a hydrogen atom and a double bond. Compounds of Formulas VII and VIII do not tautomerize because the $R_3$ moiety will not shift as the hydrogen atom does.

The products of the process of the present invention would be relatively easy to prepare if one had available various 3,4-dihydro-4-oxo-2H-1,2-benzothiazine-3-carboxylic acid-1,1-dioxides and 3,4-dihydro-3-oxo-2H-1,2-benzothiazine-4-carboxylic acid-1,1-dioxides. These compounds have been prepared by hydrolysis of the corresponding ester but they decarboxylate rapidly once formed. Decarboxylations of this type are dependent on the existence of a β-keto function. They do not occur in the absence of said functionality and, therefore, compounds of Formulas VII and VII are stable carboxylic acids. Said acids may then be contacted with amines to yield carboxamides and the ether moiety cleaved with hydrobromic acid to produce the desired anti-inflammatory agents.

The novel intermediates of the present invention are prepared from known compounds [H. Zinnes et al., Journal of Organic Chemistry, Vol. 30, p. 2241 (1965).] of the structure

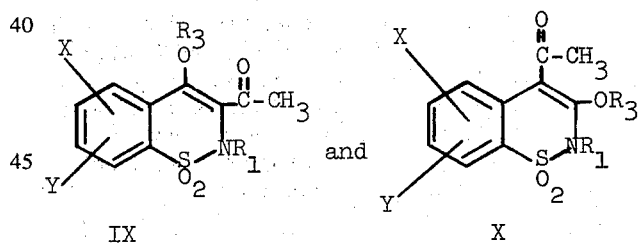

IX  X wherein X. Y, $R_2$ and $R_3$ are as previously defined by contacting them with a substantially equimolar portion of iodine both dissolved in dry pyridine at a concentration of about 1 to 20% by weight at steam bath temperatures until the oxidation reaction is substantially complete. The mixture is then concentrated in vacuo to a viscous oil, presumably the pyridinium salt. Said salt is then dissolved at a concentration of about 0.5 to 10% in approximately a ten-fold molar excess of strong aqueous base such as concentrated potassium hydroxide and the resulting solution heated at steam bath temperatures for about 0.5 to 2 hours. The reaction mixture is then cooled, acidified with a strong mineral acid such as hydrochloric acid and extracted with a water-immiscible organic solvent such as diethylether or a petroleum ether. Said organic extract is itself extracted with a sodium bicarbonate solution which is then treated with charcoal, filtered and acidified with a strong mineral acid. This aqueous acidic extract is then itself extracted with one of said water-immiscible organic solvents and the organic extract is treated with a suitable desiccant and concentrated in vacuo to an oil which slowly crystallizes to yield the desired carboxylic acid.

The preparation of compounds of the structure

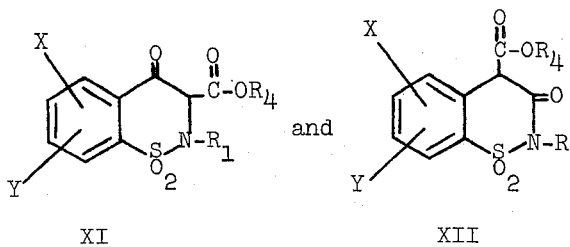

XI and XII wherein $R_4$ is selected from the group consisting of alkyl having up to 12 carbon atoms, benzyl, phenylethyl and phenylpropyl and X, Y and $R_1$ are as defined above is disclosed in U.S. Pat. No. 3,591,584. These may be converted to the corresponding alkoxy compound by contacting them with a halide, preferably the iodide, of the formula $R_3Z$ in a reaction inert solvent such as acetone in the presence of a halide scavenger such as potassium carbonate at reflux temperature until the reaction is substantially complete. Said ester may then be hydrolyzed by methods well-known to those skilled in the art to provide an alternate source of the novel carboxylic acid intermediates of the present invention.

For conversion to carboxamide anti-inflammatory products, said acid is then dispersed in a suitable reaction-inert solvent such as tetrahydrofuran, dioxane, chloroform, methylene chloride or acetonitrile at a concentration of at least 0.2% by weight. Reaction-inert solvents are those which are substantially free of adverse effects on reactants and products under the conditions employed. Said solvent should be dried before use. To the reaction medium is then added at least a substantially equimolar portion of an amine of the formula $R_2NH_2$. Preferred amines are 2-thiazolyl- and 2-pyridylamine. Since the amine is frequently less expensive than the acid, the addition of an excess of amine to force the reaction to completion is preferred. Amines do not usually react with acids to give good yields under normal reaction conditions. A number of agents are known especially to those skilled in the art of peptide chemistry, which promote this reaction. Said agents are believed to function as dehydrating agents, either causing the acid to form an anhydride or forming an activated mixed anhydride with the acid. Among the agents which promote coupling are N-ethylcarbonyl-2-ethoxy-1,2-dihydroquinoline, dicyclohexylcarbodiimide, N,N'carbonyldiimidazole and $POCl_3$. The preferred coupling promoter is said dihydroquinoline. A portion of said coupling promoter substantially equimolar with the amount of acid present is added and the reaction stirred at room temperature until substantially complete. It is preferred that additional portions of the coupling promoter be added during the course of the reaction to increase yields so that a two- to four-fold molar excess is added in total. The carboxamide product is recovered by concentrating the reaction mixture to dryness in vacuo, dissolving the residue in an organic solvent such as one of the petroleum ethers, separating the insoluble residue by filtration and concentrating to dryness again. The residue which remains is dissolved in a minimum amount of a polar, water-immiscible solvent such as methylene chloride or chloroform, washed with water and dilute mineral acid and again concentrated to dryness in vacuo. The crude carboxamide may be used directly in the next synthetic step.

Said crude carboxamide at a concentration of at least 1% by weight is then dissolved in a reaction-inert medium containing a mineral acid. The preferred reaction-inert medium is acetic acid containing about 20 to 40% hydrobromic acid by weight. The solution is then heated at a temperature of about 50° to 90°C. until the formation of a precipitate ceases. The solids are collected by filtration, washed with water and air dried to yield a 2,3-dihydro-oxo-2-$R_1$-N-$R_2$-2H-1,2-benzothiazine-carboxamide-1,1-dioxide of Formula V or VI.

EXAMPLE I

4-Isopropoxy-2-methyl-2H-1,2-Benzothiazine-3-Carboxylic Acid 1,1-Dioxide.

A dark red solution of 300 mg. (1.0 mmole) of 3-acetyl-4-isopropoxy-2-methyl-2H-1,2-benzothiazine 1,1-dioxide [Zinnes et al., Journal of Organic Chemistry, Vol. 30, p. 2241 (1965).], 254 mg. (1.0 mmole of iodine and 3 ml. of dry pyridine was heated on a steam bath for 7.5 hours. The reaction was then allowed to stand at room temperature for 7 days. Concentration of the reaction produced a brown viscous oil, presumably the pyridinium salt, which was used in the next step without further purification. A solution of (1.0 mmole) the crude pyridinum salt from the above reaction, 10 ml. of 10N potassium hydroxide and 1 ml. of water was heated at 150° for 1.5 hours. The reaction was then cooled, diluted with water and acidified with 3N hydrochloric acid. The acidic mixture was extracted 3 times with ether and the combined ether extracts washed with 250 ml. of saturated sodium bicarbonate. The basic aqueous layer was treated with charcoal, filtered and acidified with 3N hydrochloric acid. The aqueous acidic layer was extracted three times with ether, dried (sodium sulfate) and concentrated to an oil which slowly crystallized: 110 mg. (37% overall yield for the two steps); m.p. 152°–154°; i.r. 2.8 (OH) 5.95 (C=O).

| Anal. Calcd for $C_{13}H_{15}O_5NS$: | C,52.52%; H,5.09%; N,4.71%. |
|---|---|
| Found: | C,52.47%; H,5.00%; N,4.62%. |

EXAMPLE II

The procedure of Example I is followed to produce the following 3-carboxylic acids starting in each case with the corresponding 3-acetyl compound:

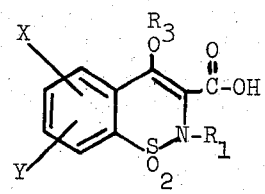

| X | Y | $R_1$ | $R_3$ |
|---|---|---|---|
| H | H | $CH_3$ | $CH_3$ |
| H | H | $CH_3$ | iso—$C_4H_9$ |
| H | H | $CH_3$ | t—$C_4H_9$ |
| H | H | H | iso—$C_3H_7$ |
| 6—$OCH_3$ | 7—$OCH_3$ | $CH_3$ | iso—$C_3H_7$ |
| 5—$OCH_3$ | H | N—$C_3H_7$ | $C_6H_5CH_2$ |
| 6—Cl | 7—Cl | methallyl | n—$C_5H_{11}$ |
| 5—$NO_2$ | H | $C_2H_5$ | t—$C_4H_9$ |
| 6—$OC_2H_5$ | H | n—$C_5H_{11}$ | $CH_3$ |
| 6—$CF_3$ | 7—$CF_3$ | allyl | $C_2H_5(CH_2)_2$ |
| 5—F | H | $CH_3$ | $C_6H_5(CH_2)_3$ |
| 8—$NO_2$ | H | iso—$C_3H_7$ | iso—$C_3H_7$ |
| 5—(n—$C_5H_{11}$) | H | iso—$C_4H_9$ | t—$C_4H_9$ |
| 6—$NO_2$ | H | $CH_3$ | iso—$C_3H_7$ |
| 6—(n—$OC_5H_{11}$) | 7—(n—$OC_5H_{11}$) | allyl | $CH_3$ |
| 7—F | H | $C_6H_5CH_2$ | iso—$C_3H_{11}$ |
| 6—($OC_2H_5$) | 7—($OC_2H_5$) | $C_6H_5(CH_2)_2$ | $CH_3$ |
| 6—Cl | 7—F | $C_6H_5(CH_2)_3$ | n—$C_6H_{13}$ |

EXAMPLE III

4-Isopropoxy-2-Methyl-N-(2-Thiazolyl)-2H-1,2-Benzothiazine-3-Carboxamide 1,1-Dioxide.

To a solution of 40 mg. (0.135 mmole) of 4-isopropoxy-2-methyl-2H-1,2-benzothiazine-3-carboxylic acid 1,1-dioxide in 1.5 ml. of dry tetrahydrofuran was added 14.2 mg. (0.142 mmole) of 2-aminothiazole in 0.5 ml of dry tetrahydrofuran. After addition of 37 mg. (0.15 mmole) of N-ethoxycarbonyl-2-ethoxy-1,2-dihydroquinoline (EEDQ) in 2 ml. dry of tetrahydrofuran, the reaction was stirred for 112 hours at room temperature with additional 37 mg. portions of EEDQ added at the 16th and 40th hours. Concentration of the reaction to dryness on a rotary evaporator gave a semi-solid which was slurried in ether and filtered. The ether filtrate was concentrated to dryness, taken up in 20 ml. of methylene chloride and washed twice with 25 ml. of 0.5N hydrochloric acid and once with water. The dried methylene chloride layer was concentrated to a dark tan gum; mass spectrum M.+ = 379 (calc. 379). This crude material was carried on to the next step without further purification.

In similar fashion, the 3-carboxylic acids of Example II may be converted to the corresponding N-(2-thiazolyl)-2H-1,2-benzothiazine-3-carboxamide-1,1-dioxides.

EXAMPLE IV 3,4-Dihydro-4-Oxo-2-Methyl-N-(2-Thiazolyl)-2H-1,2-Benzothiazine-3-Carboxamide 1,1-Dioxide.

A solution of 20 mg. (0.053 mmole) of 4-isopropoxy-2-methyl-N-(2-thiazolyl)-2H-1,2-benzothiazine-3-carboxamide 1,1-dioxide and 1.0 ml. of 32% hydrobromic acid in acetic acid was stirred at room temperature for 0.5 hr. Upon heating the solution to 50°, a precipitate formed within 15 minutes. After heating at 90° for 10 minutes the suspension was cooled, the solids filtered, washed well with water and dried: 4.0 mg. (22%), m.p. 243° dec. Mass spectrum: M.+ = 337 (superimposable with a mass spectrum of authentic material). Mixture melting point with authentic material (m.p. 242° dec.). Thin layer chromatographic (9:1 acetone-hexane eluent using Brinkman 0.25 m.m. precoated TLC plates, silica gel, F-254) comparison of the product with authentic material confirmed their identity.

In similar fashion, the 4-alkoxy compounds of Example III may be converted to the corresponding 3,4-dihydro-4-oxo-N-(2-thiazolyl)-2H-1,2-benzothiazine-3-carboxamide-1,1-dioxides.

EXAMPLE V

The procedure of Example III is followed using the compounds of Examples I and II as starting materials to produce carboxamides

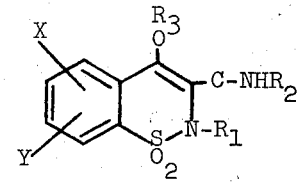

by contacting said starting materials with an amine of the formula $R_2NH_2$ wherein $R_2$ is selected from the group consisting of hydrogen, alkyl having from 1 to 8 carbon atoms, alkenyl having up to 6 carbon atoms, cycloalkyl having up to 8 carbon atoms, phenylalkyl having up to 3 carbon atoms in the alkyl moiety, phenyl, nitrophenyl, naphthyl, pyridyl, 3-methyl-2-pyridyl, 4-methyl-2-pyridyl, 5-methyl-2-pyridyl, 6-methyl-2-pyridyl, 4,6-dimethyl-2-pyridyl, 5-chloro-2-pyridyl, 5-bromo-2-pyridyl, 5-nitro-2-pyridyl, 5-carboxamido-2-pyridyl, 2-pyrazinyl, 2-pyrimidyl, 4,5-dimethyl-2-pyrimidyl, 4-pyrimidyl, 5-methyl-3-pyrazinyl, 6-methoxy-3-pyridazinyl, 1-phenyl-3-pyrazolonyl, 2-thiazolyl, 4-methyl-2-thiazolyl, 4-phenyl-2-thiazolyl, 5-bromo-2-thiazolyl, 4,5-dimethyl-2-thiazolyl, 3-isothiazolyl, 2-benzothiazolyl, 6-methyl-2-benzothiazolyl, 4-chloro-2-benzothiazolyl, 6-bromo-2-benzothiazolyl, 5-chloro-2-benzoxazolyl, 1,3,4-thiadiazolyl, 5-methyl-1,2,4-thiadiazolyl, 5-methyl-1,3,4-thiadiazolyl, 1,2,4-triazolyl, 6-phenyl-1,2,4-triazolyl, 7-indazolyl and mono- and di-substituted phenyl wherein each substituent is halogen, hydroxy, alkoxy and thioalkoxy having up to 3 carbon atoms, alkyl having up to 4 carbon atoms, trifluoromethyl, acetyl, methylsulfinyl and methylsulfonyl.

EXAMPLE VI 3,4-Dihydro-2-Methyl-3-Oxo-4-Acetyl-2H-1,2-Benzothiazine-1,1-Dioxide.

In a three-neck, round-bottom flask under nitrogen is placed 3,4-dihydro-2-methyl-3-oxo-2H-1,2-benzothiazine-1,1-dioxide [Journal of Medicinal Chemistry, 14, 973 (1971).] (1.1 g., 0.005 moles), triethylamine (0.51 g., 0.005 moles) and dry dimethylsulfoxide (10 ml.). The reaction mixture is cooled to 0°C. and maintained at that temperature while acetyl chloride (0.40 g., 0.005 moles) dissolved in ether (10 ml.) is added slowly. The reaction mixture is allowed to warm to room temperature and stirred for 24 hours. The reaction mixture is then poured into 3N hydrochloric acid (75 ml.) and the residual ether evaporated by a stream of nitrogen. The solid precipitate which forms is collected by filtration, dissolved in a minimum amount of boiling isopropanol, cooled to 0°C. and the precipitate collected by filtration and air dried to yield the title compound.

EXAMPLE VII

3-Isopropoxy-2-Methyl-4-Acetyl-2H-1,2-Benzothiazine-1,1-Dioxide

In a three-neck, round-bottom flask under nitrogen is placed 3,4-dihydro-2-methyl-3-oxo-4-acetyl-2H-1,2-benzothiazine-1,1-dioxide (1.31 g., 0.005 moles), 2-iodopropane (0.85 g., 0.005 moles, potassium carbonate (0.91 g., 0.007 moles) and acetone (20 ml.). The reaction mixture is refluxed for 48 hours and filtered. To the filtrate is added petroleum ether (50 ml.). The precipitate which forms is collected by suction filtration, recrystallized from a minimum amount of boiling petroleum ether/chloroform and air dried to yield the title compound.

EXAMPLE VIII

3-Alkoxy-4-Acetyl-2H-1,2-Benzothiazine-1,1-Dioxides

Following the procedure of Examples VI and VII, the following compounds may be produced starting in each case with the appropriate 3-oxo-2H-1,2-benzothiazine-1,1-dioxide.

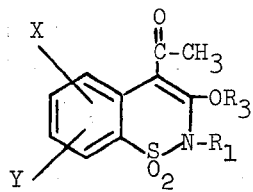

| X | Y | $R_1$ | $R_3$ |
|---|---|---|---|
| 6—$OC_2H_5$ | 7—$OC_2H_5$ | $CH_3$ | iso—$C_3H_7$ |
| 8+Br | H | $CH_3$ | $CH_3$ |
| 6—Cl | 7—Cl | methallyl | t—$C_4H_9$ |
| 8—$NO_2$ | H | n—$C_4H_9$ | $C_6H_5CH_2$ |
| 5—$OCH_3$ | H | iso—$C_4H_9$ | $C_6H_5(CH_2)_2$ |
| 6—(n—$OC_5H_{11}$) | 7—(n—$OC_5H_{11}$) | $C_2H_5$ | iso—$C_3H_7$ |
| 6—Cl | 1+ | $CH_3$ | iso—$C_3H_7$ |
| 6—$OCH_3$ | 7—$OCH_3$ | n—$C_3H_7$ | $C_6H_5(CH_2)_3$ |
| 6—$CH_3$ | H | n—$C_5H_{11}$ | iso—$C_4H_9$ |
| 7—$CF_3$ | H | allyl | $CH_3$ |
| 5—$NO_2$ | H | iso—$C_5H_{11}$ | $C_2H_5$ |
| 6—$C_2H_5$ | 7—$C_2H_5$ | $CH_3$ | t—$C_4H_9$ |

EXAMPLE IX

N-Substituted-3-Oxo-2H-1,2-Benzothiazine-Carboxamide-1,1-Dioxide

The procedure of Examples I, III and IV is followed to prepare carboxamides of the structure

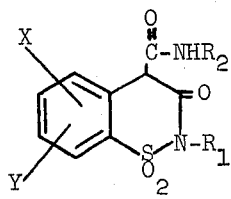

using the compounds of Examples VII and VIII as starting materials. $R_2$ is selected from the group consisting of hydrogen, alkyl having from 1 to 8 carbon atoms, alkenyl having up to 6 carbon atoms, cycloalkyl having up to eight carbon atoms, phenylalkyl having up to 3 carbon atoms in the alkyl moiety, phenyl, nitrophenyl, naphthyl, 2-pyridyl, 3-methyl-2-pyridyl, 4-methyl-2-pyridyl, 5-methyl-2-pyridyl, 6-methyl-2-pyridyl, 4,6-dimethyl-2-pyridyl, 5-chloro-2-pyridyl, 5-bromo-2-pyridyl, 5-nitro-2-pyridyl, 5-carboxamido-2-pyridyl, 2-pyrazinyl, 2-pyrimidyl, 4,5-dimethyl-2-pyrimidyl, 4-pyrimidyl, 5-methyl-3-pyrazinyl, 6-methoxy-3-pyridiazinyl, 1-phenyl-3-pyrazolonyl, 2-thiazolyl, 4-methyl-2-thiazolyl, 4-phenyl-2-thiazolyl, 5-bromo-2-thiazolyl, 4,5-dimethyl-2-thiazolyl, 3-isothiazolyl, 2-benzothiazolyl, 6-methyl-2-benzothiazolyl, 4-chloro-2-benzothiazolyl, 6-bromo-2-benzothiazolyl, 5-chloro-2-benzoxazolyl, 1,3,4-thiadiazolyl, 5-methyl-1,2,4 thiadiazolyl, 5-methyl-1,3,4-thiadiazolyl, 1,2,4-triazolyl, 6-phenyl-1,2,4-triazolyl, 7-indazolyl and mono and di-substituted phenyl wherein each substituent is halogen, hydroxy, alkoxy and thioalkoxy having up to 3 carbon atoms, alkyl having up to 4 carbon atoms, trifluoromethyl, acetyl, methylsulfinyl and methylsulfonyl.

What is claimed is:

1. A compound selected from the group consisting of those of the formulae

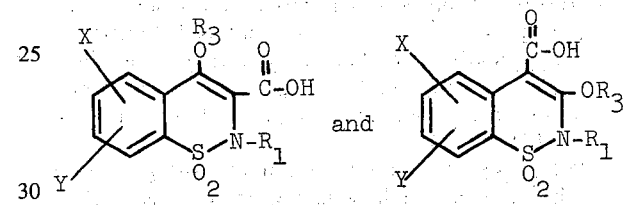

wherein X and Y are each selected from the group consisting of hydrogen, fluorine, chlorine, bromine, nitro, tirfluoromethyl and alkyl and alkoxy having up to 5 carbon atoms;

$R_1$ is selected from the group consisting of hydrogen, alkyl having up to 6 carbon atoms, alkenyl having up to 4 carbon atoms and phenyl alkyl having up to 3 carbon atoms in the alkyl moiety;

and $R_3$ is selected from the group consisting of lower alkyl, and phenylalkyl having up to 3 carbon atoms in the alkyl moiety.

2. The 3-carboxylic acid of claim 1 wherein X and Y are both hydrogen.

3. The 3-carboxylic acid of claim 1 wherein $R_1$ is methyl.

4. The 3-carboxylic acid of claim 1 wherein $R_3$ is isopropyl.

5. 4-Isopropoxy-2-methyl-2H-1,2-benzothiazine-3-carboxylic acid-1,1-dioxide.

6. A process for preparing a compound selected from the group consisting of

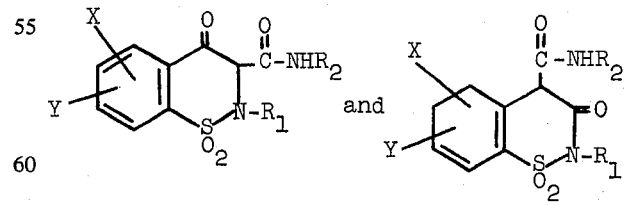

wherein X and Y are each selected from the group consisting of hydrogen, fluorine, chlorine, bromine, nitro, trifluoromethyl and alkyl and alkoxy each having up to 5 carbon atoms;

$R_1$ is selected from the group consisting of hydrogen, alkyl having up to 6 carbon atoms, alkenyl having up to 4 carbon atoms and phenylalkyl having up to 3 carbon atoms in the alkyl moiety;

R₂ is selected from the group consisting of hydrogen, alkyl having up to 8 carbon atoms, alkenyl having up to 6 carbon atoms, cycloalkyl having up to 8 carbon atoms, phenylalkyl having up to 3 carbon atoms in the alkyl moiety, phenyl, nitrophenyl, naphthyl, 2-pyridyl, 3-methyl-2-pyridyl, 4-methyl-2-pyridyl, 5-methyl-2-pyridyl, 6-methyl-2-pyridyl, 4,6-dimethyl-2-pyridyl, 5-chloro-2-pyridyl, 5-bromo-2-pyridyl, 5-nitro-2-pyridyl, 5-carboxamido-2-pyridyl, 2-pyrazinyl, 2-pyrimidyl, 4,5-dimethyl-2-pyrimidyl, 4-pyrimidyl, 5-methyl-3-pyrazinyl, 6-methoxy-3-pyridazinyl, 1-phenyl-3-pyrazolonyl, 2-thiazolyl, 4-methyl-2-thiazolyl, 4-phenyl-2-thiazolyl, 5-bromo-2-thiazolyl, 4,5-dimethyl-2-thiazolyl, 3-isothiazolyl, 2-benzothiazolyl, 6-methyl-2-benzothiazolyl, 4-chloro-2-benzothiazolyl, 6-bromo-2-benzothiazolyl, 5-chloro-2-benzoxazolyl, 1,3,4-thiadiazolyl, 5-methyl-1,2,4-thiadiazolyl, 5-methyl-1,3,4-thiadiazolyl, 1,2,4-triazolyl, 6-phenyl-1,2,4-triazolyl, 7-indazolyl and mono and di-substituted phenyl wherein each substituent is halogen, hydroxy, alkoxy and thioalkoxy having up to three carbon atoms, alkyl having up to four carbon atoms, trifluoromethyl, acetyl, methylsulfinyl and methylsulfonyl;

and R₃ is selected from the group consisting of lower alkyl and phenylalkyl having up to three carbon atoms in the alkyl moiety;

said process comprising contacting a compound of the structure

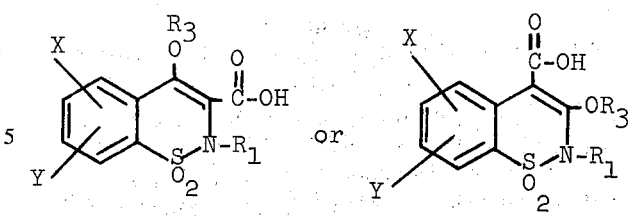

with a substantially equimolar portion of an amine of the structure $R_2NH_2$ in reaction-inert solvent in the presence of an approximately two- to four-fold molar excess of a coupling promoter selected from the group consisting of N-ethoxycarbonyl-2-ethoxy-1,2-dihydroquinoline, dicyclohexylcarbodiimide, N,N-carbonyldiimidazole and $POCl_3$ until reaction is substantially complete;

and contacting the resulting carboxamide with mineral acid in reaction-inert solvent at a temperature between about 50° and 90°C. until reaction is substantially complete.

7. The process of claim 6 wherein $R_2NH_2$ is 2-aminothiazole.

8. The process of claim 6 wherein $R_2NH_2$ is 2-aminopyridine.

9. The process of claim 6 wherein said coupling promoter is N-ethoxycarbonyl-2-ethoxy-1,2-dihydroquinoline.

10. The process of claim 6 wherein contact with said amine is effected between about 15° and 50°C.

11. The process of claim 6 wherein said mineral acid is hydrobromic acid.

12. The process of claim 6 wherein contact with said mineral acid is effected in acetic acid.

* * * * *